United States Patent [19]

Kaak et al.

[11] Patent Number: 5,590,045

[45] Date of Patent: Dec. 31, 1996

[54] CONTROL SYSTEM FOR A PRODUCTION MACHINE, ESPECIALLY A RING-SPINNING MACHINE

[75] Inventors: Hartmut Kaak, Ebersbach/Fils; Andreas Neuendorf, Boll, both of Germany

[73] Assignee: Zinser Textilmaschinen GmbH, Ebersbach/Fils, Germany

[21] Appl. No.: 388,222

[22] Filed: Feb. 13, 1995

[30] Foreign Application Priority Data

Feb. 17, 1994 [DE] Germany ............... 44 05 088.7

[51] Int. Cl.⁶ .................. G06F 19/00; G05B 21/02
[52] U.S. Cl. ........................ 364/470.1; 57/264
[58] Field of Search ................. 364/131, 132, 364/138, 139, 184–187, 468, 470; 57/264, 265

[56] References Cited

U.S. PATENT DOCUMENTS

| 4,864,519 | 9/1989 | Appleby et al. | 364/138 |
| 4,933,833 | 6/1990 | Petroff | 364/138 |
| 5,046,013 | 9/1991 | Ueda et al. | 364/470 |

FOREIGN PATENT DOCUMENTS

| 0389849 | 3/1990 | European Pat. Off. |
| 3813945 | 10/1988 | Germany. |
| 4319485 | 1/1995 | Germany. |

OTHER PUBLICATIONS

Lokale Netze, Systeme Für Den Hockleistungs–Informationstransfer, Kauffels, Franz–Joachim 1984.

*Primary Examiner*—Roy N. Envall, Jr.
*Assistant Examiner*—Steven R. Garland
*Attorney, Agent, or Firm*—Herbert Dubno

[57] ABSTRACT

A control system for a production machine especially a spinning machine has a multiplicity of working stations each of which has at least one sensor to determine an operating parameter and at least one effector for carrying out a control operation. The modules responsive to the sensor signals and the modules for producing commands to the effector are connected together in chains and the one end of each chain is connected to a central unit providing the management circuitry and is capable of initialization of the module chain. Data transmission is effected from module to module along the chain.

15 Claims, 7 Drawing Sheets

CONTROL SYSTEM FOR A PRODUCTION MACHINE, ESPECIALLY A RING-SPINNING MACHINE

FIELD OF THE INVENTION

Our present invention relates to a control system for a production machine, especially a ring-spinning machine. The invention is particularly directed to control systems of the type in which a multiplicity of working stations are arrayed along a machine, e.g. spinning stations with respective spindles, traveller rings and the like, and each station is provided with at least one sensor for detecting an operating parameter and/or an effector for carrying out a control operation to achieve a desired control result. The control system in such cases must be able to evaluate sensor signals and/or to control the effectors.

BACKGROUND OF THE INVENTION

In the control of production machines, especially spinning machines, the control operations are complicated by the large number of effectors and sensors which are provided. For example, during the operation of a spinning machine, frequently several hundred working stations must be monitored for development of yarn breaks or sluggish spindles, i.e. spindles whose speeds fall below the set point or limiting speed by an impermissible amount. If a yarn break at a certain work station is detected, this station is preferably brought to standstill and further feed of the material to be processed, e.g. a roving or sliver, must be prevented, e.g. by the activation of a roving-stop device.

In spinning machines of a significant length, the cabling between the sensors and effectors at the work stations and the central control station usually located at an end of the machine, contributes an especially high cost to the overall capital cost of the machine.

To reduce the cabling cost, it has been proposed, for example, in German patent document DE 38 13 945, that the sensors and effectors of a machine segment be connected by means of channels which collect the data flow. Data concentrators are provided for communication with the central unit and the data concentrators can be connected by a bus system.

A drawback of this control system for a spinning machine is that, with enlargement of the machine to add, for example, additional spindles or working stations, a higher data transfer rate is required and, unless the bus has been overdesigned to accommodate the higher data transfer rate, the bus system may limit the expansion of the machine.

EP 0 389 849 A2 describes a control system for a textile machine in which each production station is provided with a local electronic circuit which is designed for autonomous control of that station at least in part so that it assumes at least a portion of the control function. A plurality of such production stations form a section of the textile machine and each such section can have a control circuit to which the local control is subordinated. All of the section control circuits can be connected via a data bus to the central machine control unit which has still a higher level in the control hierarchy.

In this manner a largely decentralized control system is provided and the data bus need handle only a limited amount of data. The disadvantage of such a system, however, is that the local circuit at the particular production station must be designed for, and have the capacity for, a multiplicity of important control functions or all of the important local functions. This circuitry, therefore, can be very complex and must be designed individually for each production station so that expansion of machine functions or control functions or even of the machine itself is complicated.

OBJECTS OF THE INVENTION

It is, therefore, the principal object of the present invention to provide a control system for a production machine, especially a spinning machine, which avoids the afore-described drawbacks, allows control of many or all of the production stations at a reduced cost, and simplifies an expansion of the machine by the addition of work stations or, in the case of a spinning machine, additional sections with spinning spindles.

Another object of the invention is to provide an improved spinning machine with simplified control of the respective spinning stations.

Still another object of this invention is to provide an improved control system for a spinning machine or a spinning machine with an improved control system, whereby the cabling cost is significantly reduced, complex and individualized local control circuitry is not required and failure within the control system is easily accommodated.

SUMMARY OF THE INVENTION

These objects and others which will become apparent hereinafter are attained, in accordance with the present invention, in a control system for a production machine, especially a spinning machine which has a multiplicity of work stations, each having a sensor for detecting an operating parameter and/or an effector for achieving a result and control electronics for evaluating the sensor signal and/or for operating the effectors.

According to the invention, the control electronics is constituted by a central control unit and a multiplicity of modules or components which can be connected each to a plurality of sensors and/or effectors, the modules serving for evaluating the signals from the sensors and/or for generating the trigger signals for the effectors and being provided with means for communicating data between the modules and the control unit. The modules are subordinate and the central control unit superordinate in the control hierarchy. According to the invention, further, the modules are provided in at least one chain connected with the central control unit and data transfer between the central control unit and a certain module is effected through the neighboring modules in the chain to the central unit. The control system thus can comprise:

a multiplicity of terminal elements selectively including:
   at least one sensor element at each station detecting at least one operating parameter at the respective station and producing a sensor signal representing a detected operating parameter, and
   at least one effector element at each station carrying out a control function at the respective station in response to at least one effector signal; and
control circuitry for the elements for evaluating the sensor signals and generating the effector signals, the control circuitry comprising:
   a central control unit,
   a multiplicity of similar control modules spaced along the machine, each of the control modules being connected to a plurality of the elements and including means for evaluating the sensor signals or generating the effector signals and means for communicating data between the modules and between one of the modules and the central control unit, and means for connecting the modules serially in at least one chain and for connecting the at least one chain to the central unit for data transfer from the chain to the central unit being effected from one module through another module in succession along the chain and, conversely, for data transfer from the central unit to the chain being effected from one module through another module in succession along the chain.

According to the invention, at least one pair of module chains is provided and additional means is provided for connecting the modules at the ends of the chain opposite the central control unit. Each module chain of a pair can be connected individually to the central control unit and independently of the other chain of the pair in a reconfiguration of the original module chain. Advantageously, this connection is effected so that upon an interruption of the connection between two modules or upon breakdown of one of the modules, new chains are formed to either side of the interruption which communicates in the aforedescribed manner with the central unit.

According to a feature of the invention, all of the modules of a chain are connected either only with sensors or only with effectors.

The central control unit can carry out an initialization routine upon switching all of the control system and/or at predetermined timed intervals. The initialization routine can assign an address to each component of each chain and the number of modules per chain and compare that value with a set point count stored in the central control unit.

The invention also comprises a spinning machine which can have a multiplicity of spinning stations each receiving a supply of sliver, having means for spinning the sliver into yarn and having a sliver-stopping device. The machine further includes:

a multiplicity of terminal elements including:

at least one sensor element at each station monitoring yarn continuity and producing a sensor signal representing a yarn failure, and/or an effector element at each station for operating the respective sliver-stopping device in response to at least one effector signal; and control circuitry for the elements for evaluating the sensor signals and generating the effector signals, the control circuitry comprising:

a central control unit, a multiplicity of similar control modules spaced along the machine, each of the control modules being connected to a plurality of the elements and including means for evaluating the sensor signals or generating the effector signals and means for communicating data between the modules and between one of the modules and the central unit, and means for connecting the modules serially in at least one chain and for connecting the at least one chain to the central unit for data transfer from the chain to the central unit being effected from one module through another module in succession along the chain and, conversely, for data transfer from the central unit to the chain being effected from one module through another module in succession along the chain.

The sensor elements can be rotary speed sensors or tachometers responsive to the rotary speeds of the travellers or of the yarn balloons of each spindle or of the spindles themselves so as to be capable of detecting yarn breaks and/or creeping spindles.

The stations can be provided in rows on opposite sides of the machine with each side of the machine having all of the sensor elements thereof connected to modules of one of the chains and all of the effector elements thereof connected to modules of another of the chains.

As noted, the central unit and the modules can be in a control hierarchy with the central unit dominant and modules subordinate, the central unit being formed as an intelligent multifunctional component coordinating all functions of the modules and the sensor and effector elements.

The machine can have a central machine control which is connected by a bus with the central unit.

Advantageously, the sensor elements on one side of the machine can be received in a hollow sensor rail extending along the respective machine side and the modules connected with these sensor elements can be located within the rail. The machine can be a ring spinning machine whose ring rail is formed with or is constituted by the sensor rail.

All of the sliver-stop devices on a side of the machine can be mounted on a hollow metal rail and the modules connected with the effector elements on this machine side can be received in that rail.

By providing the modules which can be respectively connected with a plurality of sensors and/or effectors, we can ensure that the same electronic circuit, namely, the module, with the same functions, can be provided for a multiplicity of work stations, thereby significantly reducing the circuitry costs and eliminating the need for separate electronics for different operating stations.

Since the modules provide the significant evaluation and control functions for the sensors or effectors, the connections of the modules with the superordinate control unit need only accommodate a relatively small data rate.

The modules in the form of at least one chain are so connected with the superordinate control unit that the data transfer between the control unit and a predetermined control module is effected through each preceding module in the chain and conversely. As a result, an expansion of the machine can be carried out most simply since additional modules can be added to any chain for the additional sensors and/or effectors. By contrast with a bus system, there is no lengthening of the bus and hence no increase in data rate which must be accommodated by a bus originally designed for a more limited data rate. There is no need further to remove any shunt resistance as is commonly provided on a bus system. One need only add the next module to the terminal module of a chain.

By interconnecting the chains at their ends remote from the control unit, and independently connecting each of the chains to the control unit for a given path of such chains, upon failure of any module or interruption of a connection between any two modules, two new chains are created terminating at the interruption and allowing communication with the central control unit in the previously described manner. Neither the failure of a connection between modules nor the failure of a module, therefore, will interfere with the functionality of the control system. The continuity of function is facilitated by the periodic initialization routine which is carried out and which can be coupled with a periodic diagnostic routine which can signal to the central station a failure of an intermodule connection or the failure of one of the modules.

The initialization and diagnostic routines can call up each module of a chain in succession and monitor the status of the data set in each module. In this manner, it is possible to detect not only the failure of the connection between two modules, but also the failure of any effector signal to be generated for a predetermined effector or a failure of a module to evaluate a signal received from an assigned sensor. By limiting the modules of each chain to connection either with the sensor effectors, the modules can be simplified and the connections of the sensor or effector elements thereto can be kept as short as possible as well.

The use of hollow rails to accommodate the modules, provides shielding of the modules against straying electromagnetic fields.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
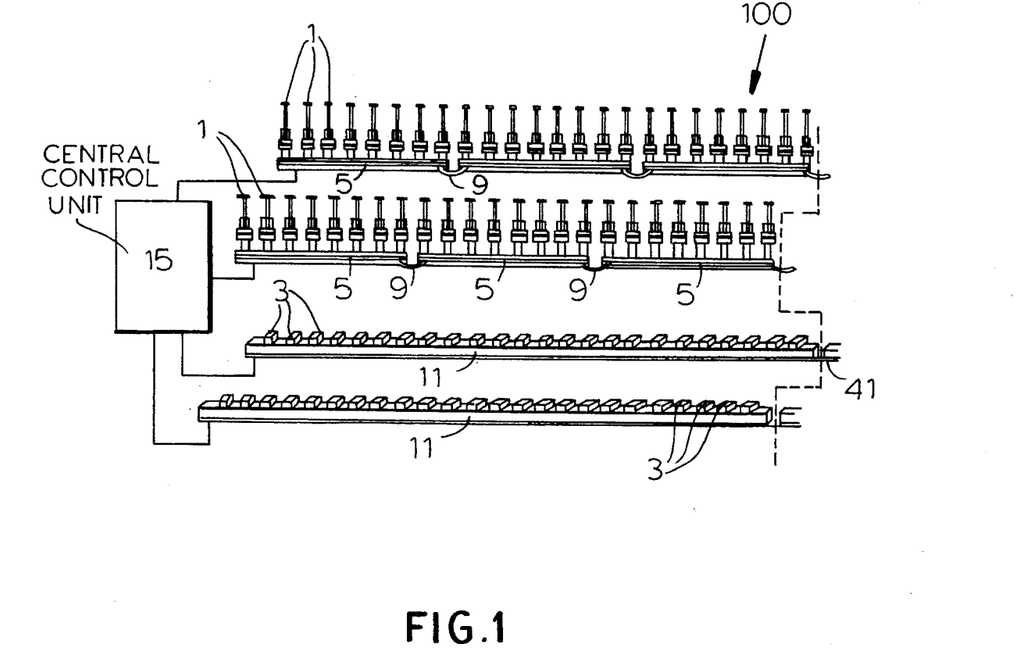
FIG. 1 is a schematic illustration of the yarn monitors and sliver-stop devices of a section of a spinning machine with the control system partly visible.

In FIG. 1 there has been shown, highly symbolically and without the standard details, a spinning machine such as a ring-spinning machine 100 of which only the sliver-stop devices 1 and the yarn-break sensors 3 are visible. Furthermore, only a single section of the machine has been illustrated. It will be understood that the machine is normally assembled with a multiplicity of such sections, having spinning spindles in rows along opposite sides of each section and with the machine controls usually located at one end thereof. Each of the spinning stations thus has one sliver-stop device 1 and one yarn-break sensor 3.

The sliver-stop devices 1 are mounted upon a sliver-stop rail 5 which is composed of metal and is hollow to receive the electronic modules described hereinafter. In the embodiment illustrated in FIG. 1, each rail 5 carries eight sliver-stop devices 1 so that on each side for each section there are a total of twenty-four sliver stop devices 1 on three sliver-stop rails 5. It will be understood that any other rail length or number of sliver-stop devices per rail is possible. For example, all of the sliver-stop devices of a section can be provided on a single rail.

Each sliver-stop device 1 is associated with an electronic sliver-stop control module (FIG. 2) which is located within the respective rail 5 and is protected thereby, together with connecting lines, against contamination, mechanical damage and electromagnetic stray fields. Preferably all of the sliver-stop devices of a rail 5 are connected to a single sliver-stop control module 7 and that rail makes up one of a number of rails forming the respective side of the spinning machine.

The individual sliver-stop module 7 within the rails 5 are connected by conductors 9, preferably shielded conductors with plugs at their ends engaged in sockets in the respective modules.

Similarly, the thread break sensors 3 are mounted on a single rail 11 which, like the sliver-stop rial 5, is preferably composed of a metallic material and is hollow along its longitudinal axis to accommodate the respective electronic control modules.

As can be seen from FIG. 1, all yarn break modules 3 of one machine side of each section of the spinning machine are mounted on a single sensor rail 11. Here too, various optional rail lengths can be used with optional numbers of yarn sensors per rail 11.

Within the sensor rail 11, respective electronic yarn monitoring control modules 13 (FIG. 2) are disposed, each module 13 being connected with, say, twenty-four yarn monitors of a section of one machine side. Obviously the number of modules 13 per sensor rail and the number of yarn monitors 3 per module 13 can be selected optionally as well. The provision of the yarn monitor modules 13 within the rail 11 is intended for the foregoing reasons, i.e. to prevent contamination, protect them mechanically and provide electromagnetic shielding. Preferably, each first sliver-stop module 7 or yarn-monitor module 13 on each machine side is connected with the superordinate control unit 15 which functions to manage the sliver-stop modules 7 and yarn-monitoring modules 13 which are connected in respective chains, as well as to coordinate and carry out all of the control functions at the highest hierarchical level.

However, each section of the spinning machine can have a separate superordinate control yarn 15 or a single control unit for a limited number of modules 7 or 13, in each case a bus may be provided for connection of the units 15 to the center machine control. In most cases, however, the chains will be so created that the first module of a subsequent section will be connected to the last module of a preceding section proximal to the control unit 15 in the chaining of the modules together. A schematic illustration of the control system of the invention is found in FIG. 2. This Figure in a simplified way shows a control system for a two-section machine with one control unit 15. If the machine has more than two sections, of course, then it will have a number of such control units 15 which can be connected to a central machine station not shown by a bus 17. The control unit 15 is preferably a multifunctional intelligent system of the type described in German patent document 43 19 485 and supplies the regulation and control functions required for the sliver-stop modules 7 and the yarn-monitoring modules 13.

Figure 2:
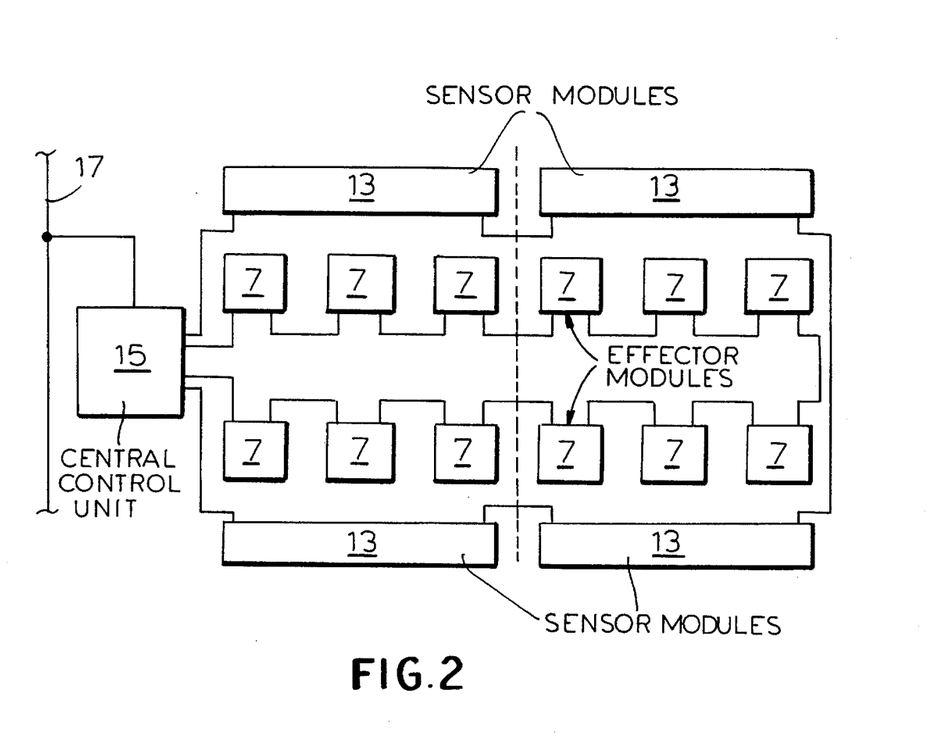
FIG. 2 is a block diagram of the control system especially for the spinning machine of FIG. 1.

As is also apparent from FIG. 2, all of the modules 7, 13 at each side of the machine are connected in a chain with the superordinate control unit 15. Basically the control of each module chain on a given side of the machine is carried out individually from the corresponding chain on the other machine side. The communication between the control unit 15 and one or more of the modules 7, 13 is so carried out that either the control unit 15 or one of the modules 7, 13 can play the role of master while the remaining modules or the control unit 15 can be slaved thereto. In this manner, data collisions are prevented.

By the individual management and control of the four module chains shown in FIG. 2, simultaneously four communication processes can be effected between the control unit and a module 7, 13 of the four chains simultaneously or quasisimultaneously. If control must be expanded to further modules 13 or 17, it is only necessary to connect these modules in succession or in a chain to the end of the preceding chain and then to interconnect the chains of corresponding modules at their ends in the manner shown in FIG. 2. Any change in management or control structure is detected when the control system is turned on or periodically through the initialization routine which provides an address for each module and determines the number of modules per chain.

The control unit 15 can transmit to the center system by the bus 17 the information recorded of the number of modules in each chain so at the central station or at the control unit 15 the number of modules which are operative can be compared to the number which should be operative to determine any failure of one or more modules.

To increase reliability in the case of failure of a module or a connection between modules, the end modules of corresponding chains are interconnected. In this case, should there be a connection failure between neighboring modules or the failure of a module itself, the modules on opposite sides of the failure become terminal modules of newly formed chains and the communication with the control unit 15 remains unbroken.

Figure 3:
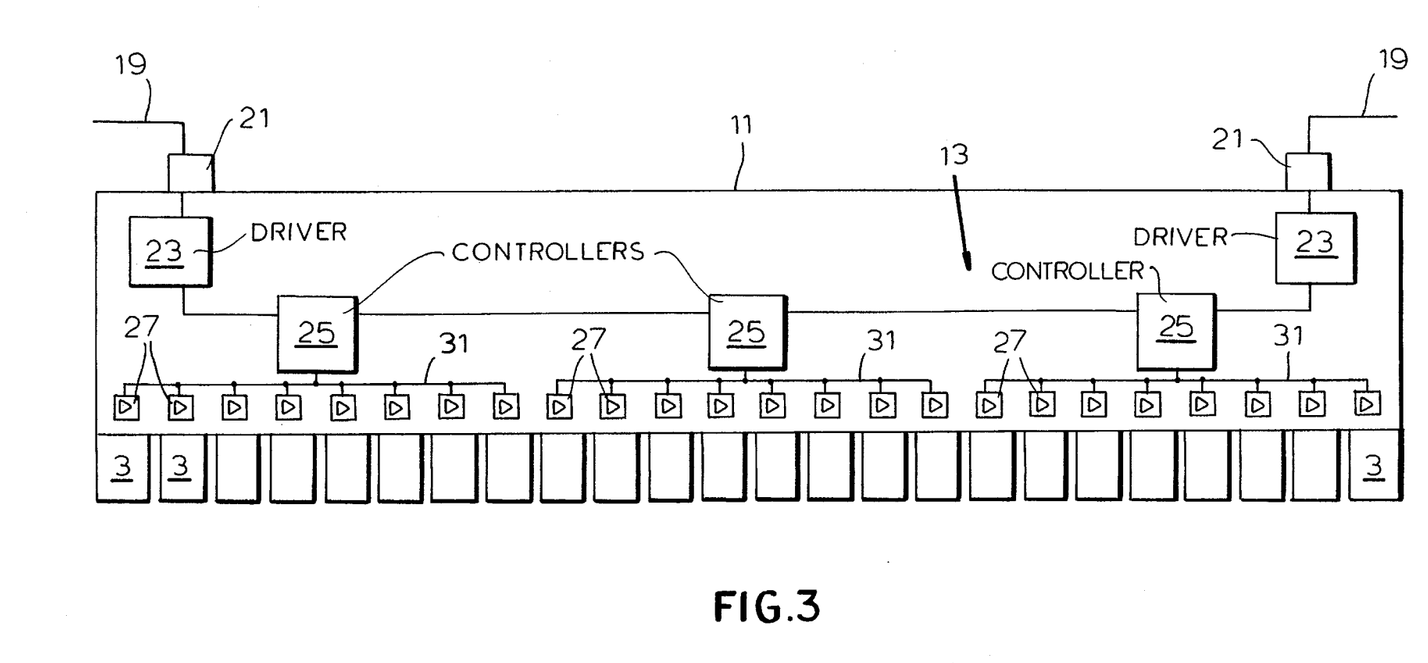
FIG. 3 is a schematic block diagram of a yarn sensor module according to the invention.

FIG. 3 shows in greater detail the construction of one of the yarn monitor modules 13 accommodated in the sensor rail 11.

Each sensor rail 11 is provided with mechanical means, such as plug and jack connections 21 for the conductors 19 connecting these rails in circuit and within each rail 11 the plug and jack connectors are provided with respective drivers 23. The circuitry within the rail includes, between the drivers 23, a plurality of controllers 25, each of which is connected in turn with eight of the twenty-four monitors via conductors 31 and amplifiers 27. Monitors, or sensors 3, are juxtaposed with the amplifiers 27 which supply respective amplified sensor signals via the line 31 to the controllers 25. It will be apparent that the number of controllers 25 is optional and, depending upon the response which is required, can be up to the number of yarn-break monitors 3 which can be used.

Figure 4:
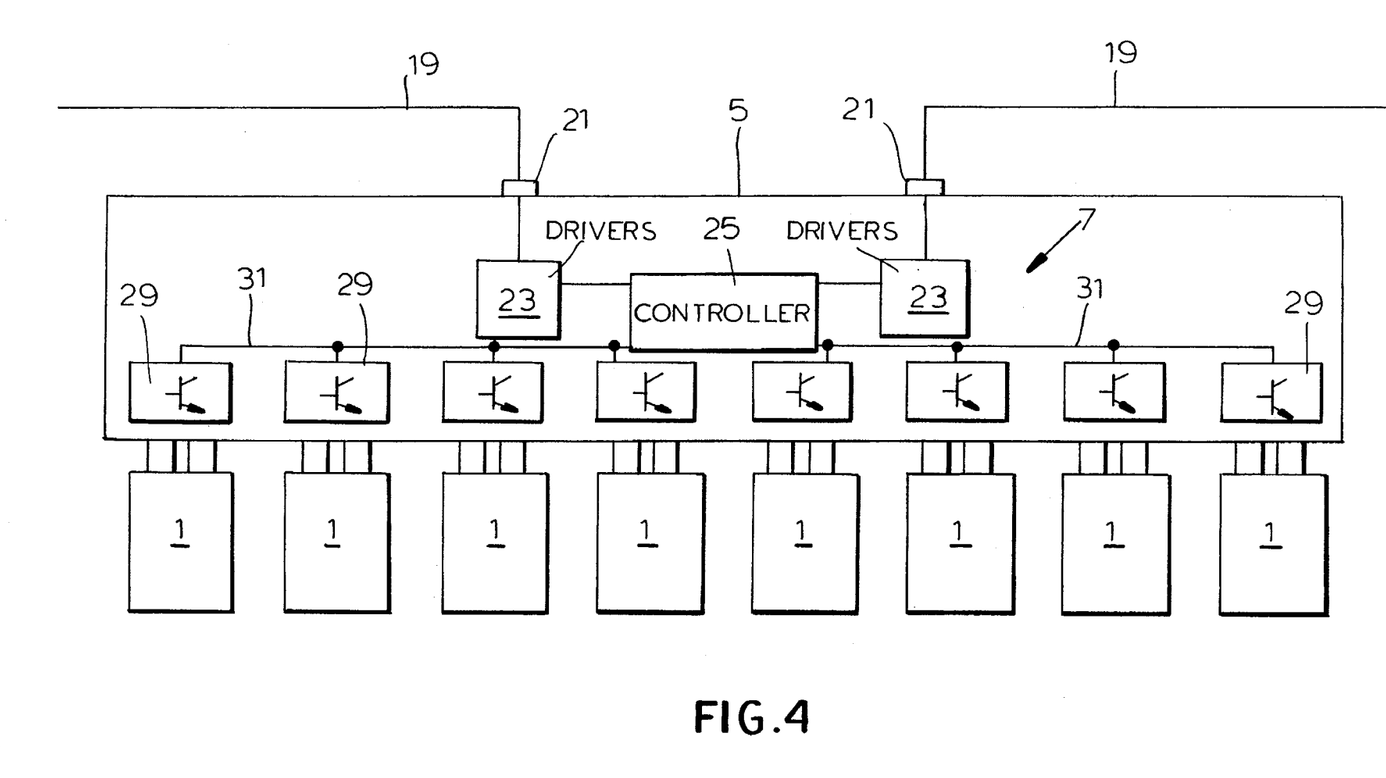
FIG. 4 is a schematic block diagram of a sliver-stop control module according to the invention for use in the system of FIG. 2.

FIG. 4 shows in an analogous way, the sliver-stop module 7 integrated in the rail 5 and also provided with plug and jack connectors for the conductors 19 which connect the rail together and to the unit 15.

Here a controller 25 is also provided between the drivers 23 and is connected to output units 29 which produce the effector signals for the sliver-stop devices 1. The conductors 31 connect the controller to the output drivers 29. It will be apparent that the conductors 31 in FIGS. 3 and 4 represent internal buses connecting the respective controller with the input amplifiers 27 or the output drivers 29.

Figure 5:
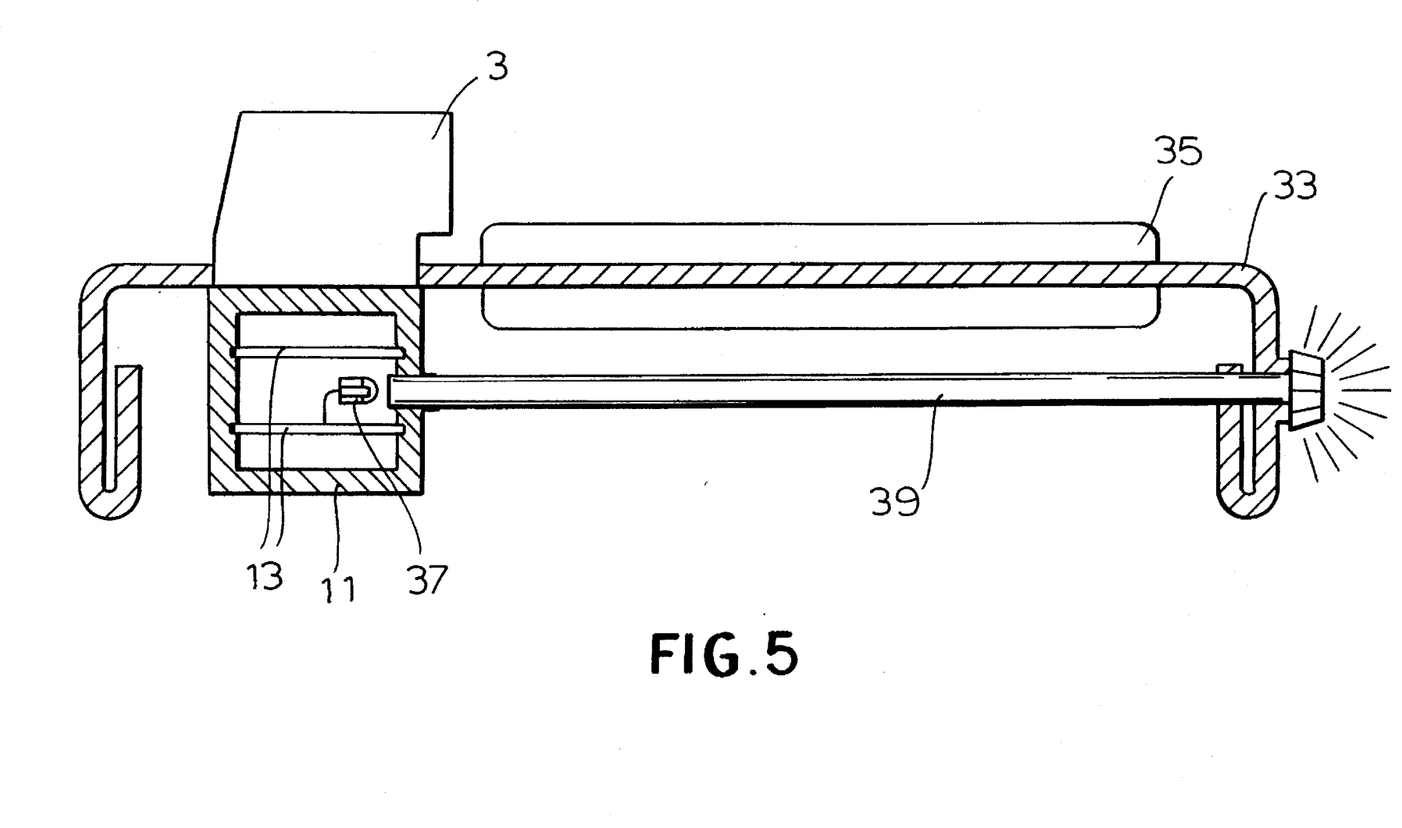
FIG. 5 is a diagrammatic section through a ring rail of a ring spinning machine provided with the hollow metal rail receiving the sensor modules.

FIG. 5 shows a cross section of a ring rail 33 of a ring-spinning machine and on which the rings 35 are arranged, the travellers orbiting about the spindle on the ring. On the ring rail 33, the sensor rails 11 are mounted in the interiors of which are the respective electronic yarn-monitor modules 13. On the sensor rails the yarn monitors 3 are provided and are trained upon the ring so as to respond to the rotary speed of the balloon or the traveller. The yarn monitors 3 can extend through openings in the rail 33.

As can be seen from FIGS. 1 and 5, the sensor modules 3 can have one or more, in a preferred case two, light elements or lamps 37 per section and machine side.

Should a yarn break be detected by means of a yarn monitor 3 and the respective yarn monitor module 13 in a particular section, the lamp 37 thereof is activated signalling the failure for the respective group of yarns 3, or the particular yarn monitor 3.

To reduce wiring costs, the light element 37, which can preferably be a light-emitting diode, can be directly mounted on the printed circuit board of the module 13 in the interior of the sensor rail 11 and the outputted light can be displayed on the front side of the rail 33 by means of a light pipe or guide 39.

Figure 6:
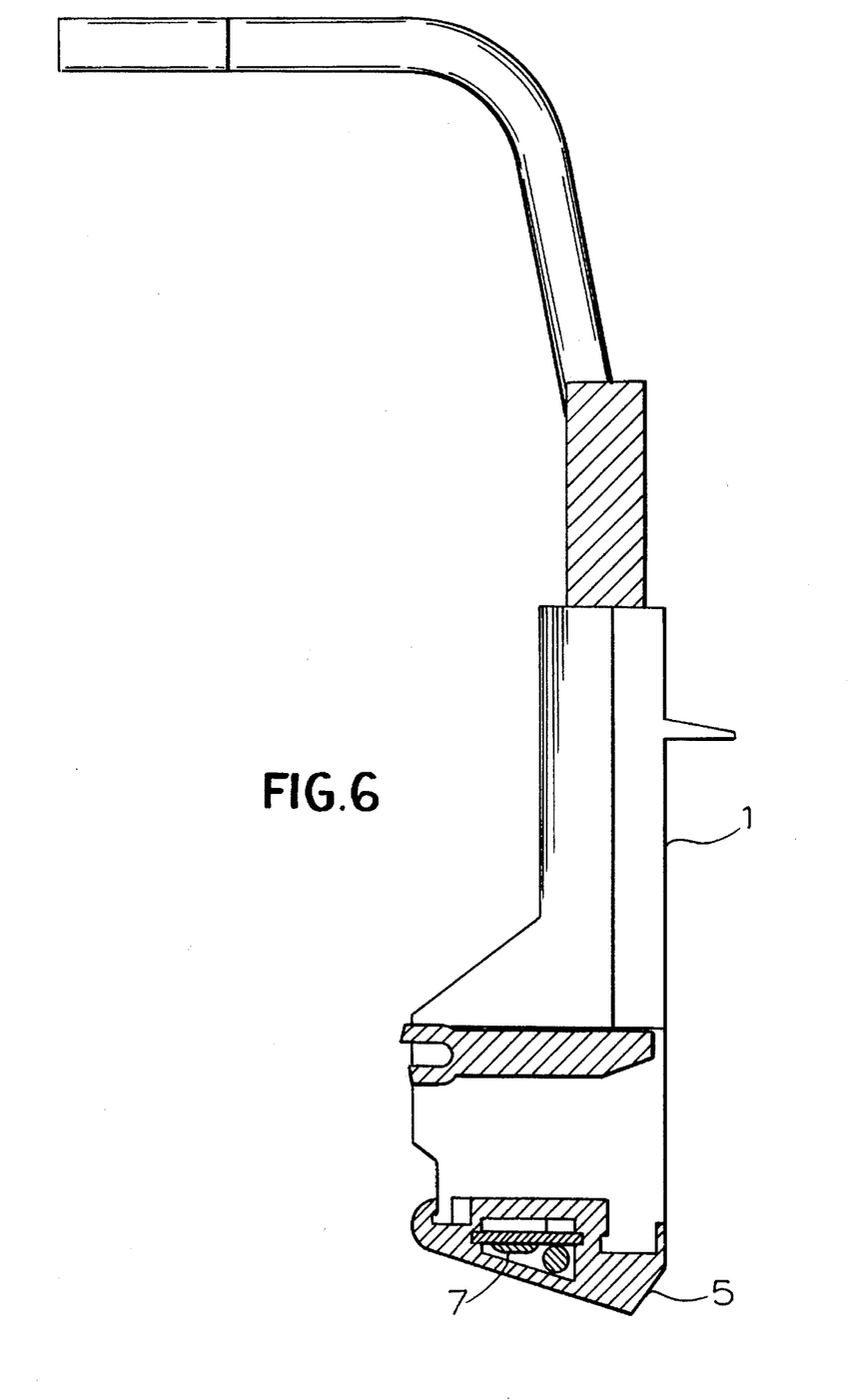
FIG. 6 is a diagrammatic section of a sliver-stop rail provided with the effector modules integrated therein.

In FIG. 6 we have shown a cross section of the sliver-stop rail 5 in the interior of which the sliver-stop modules 7 are provided.

As can be seen from FIG. 1, the connection of the sensor rail 11 or the sliver-stop rails 5 can be effected also in such manner that the requisite contacts are provided on the underside of the rails and can cooperate with a contact plate 41 (FIG. 1) but upon which 1:1 wiring is provided. Such contact plates 41 can be provided on respective ends of the rail so when the rails are aligned with one another they automatically electrically interconnect between them. It will be understood as well that the arrangement of the modules 7, 13 in the rails 5, 11 can be effected independently of the type of module and the connection of the modules together or with the superordinate control unit for the purpose of reducing cabling and mounting cost and to additionally reduce defects resulting from electromagnetic stray fields.

Figure 7:
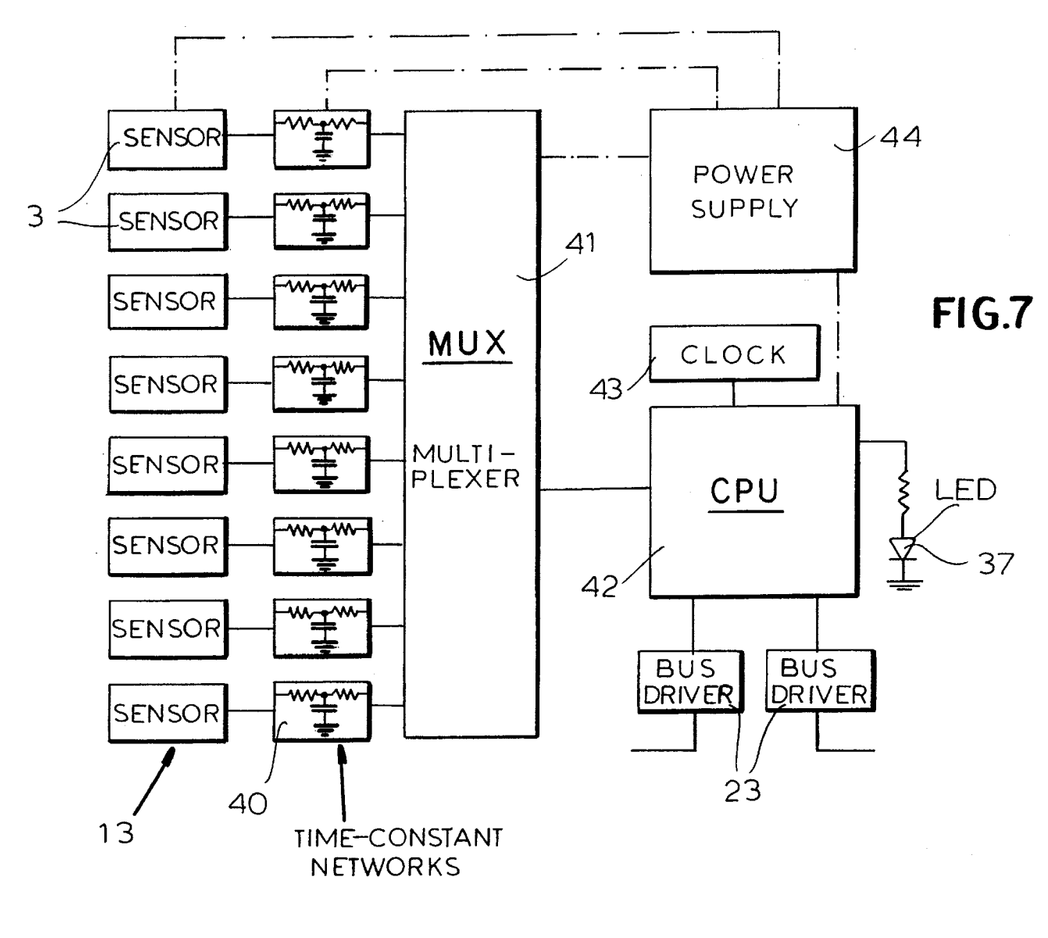
FIG. 7 is a block diagram of circuitry of the sensor modules.

As can be seen from FIG. 7, the circuitry associated with each of the sensor modules 13 can comprise respective time-constant networks 40 connected to a multiplexor-based central processing unit or CPU 42. The microprocessor may have a memory which can serve to register the addresses associated with the sensors 3 for identifying them as part of the initialization test procedure.

The memory also may contain information which can be compared with the sensor data so that the data which is transmitted along the bus via the bus drivers 23 previously described, has already been preprocessed and packaged to minimize the data rate required. The CPU 42 has a clock 43 and is provided with the LED or lamp 37 whose function has previously been described.

A power supply 44 can be provided for the sensors, the multiplexor, the CPU and the other local circuit elements as required.

Figure 8:
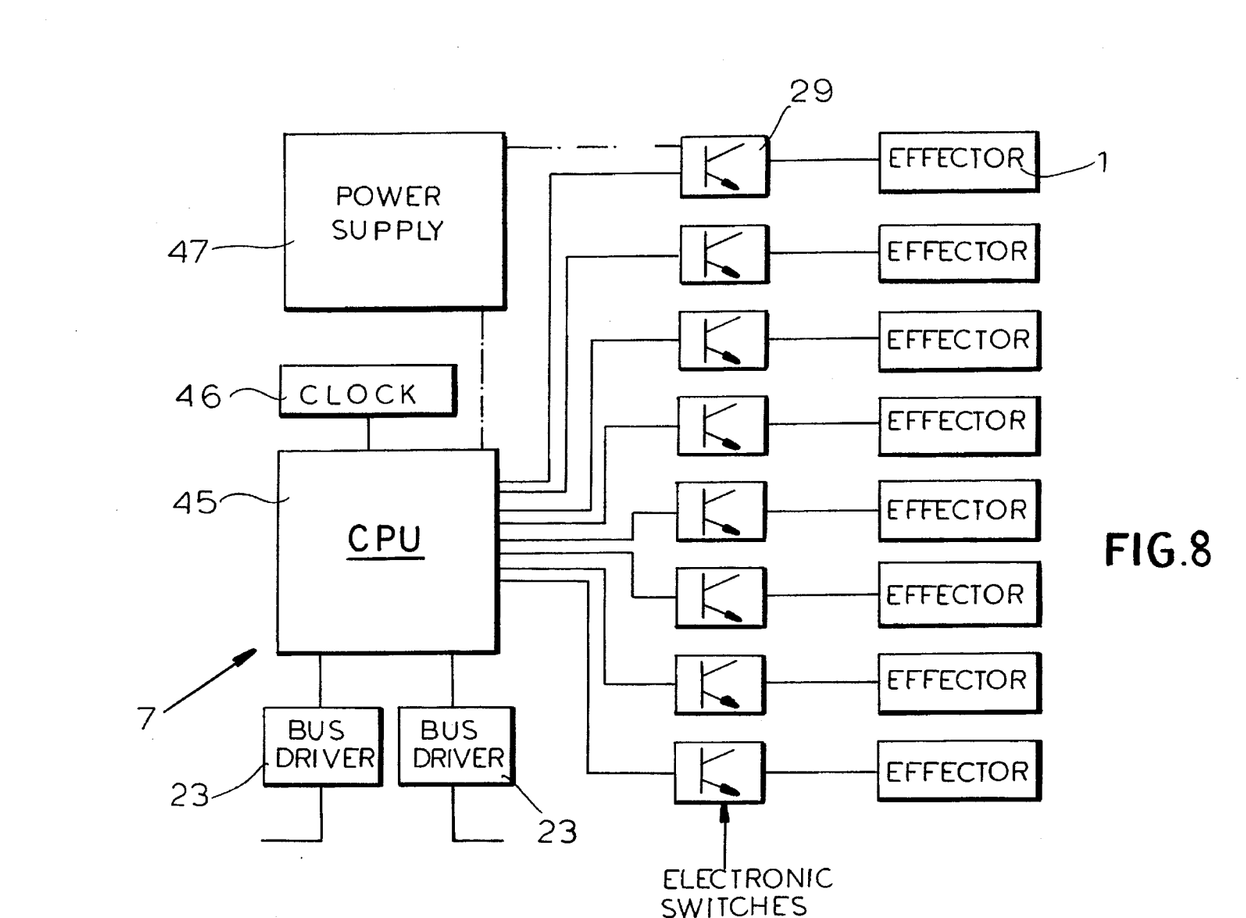
FIG. 8 is a block diagram of circuitry of the effector module.

In FIG. 8 the module 7 is shown to comprise, analogously, a CPU or microprocessor-based computing unit with memory as represented at 45, receiving signals from the bus via the drivers 23. A clock 46 is provided for this CPU as well. The outputs from the CPU 45 can be applied to the electronic switches 29 which control the respective effectors 1. A power supply 47 serves the electronic components and these modules as well.

We claim:

1. A spinning machine comprising:
    a multiplicity of spinning stations each receiving a supply of sliver, having means for spinning said sliver into yarn and having a sliver-stopping device arranged in a row;
    a multiplicity of terminal elements including
        at least one sensor element at each station monitoring yarn continuity and producing a sensor signal representing a yarn failure, and
        an effector element at each station for operating the respective sliver-stopping device in response to at least one effector signal; and control circuitry for said elements for evaluating said sensor signals and generating said effector signals, said control circuitry comprising:

a central control unit, a multiplicity of similar first control modules spaced along the row, each of said first control modules being connected to a plurality of said sensor elements and including means for evaluating said sensor signals and means for communicating data between said first modules and between one of said first modules and said central unit, and a multiplicity of similar second control modules spaced along the row, each of said second control modules being connected to a plurality of said effector elements and including means for generating said effector signals and means for communicating data between said second modules and between one of said second modules and said central unit, and means for connecting said first modules of the row serially in at least one chain and for connecting said second module serially in at least one other chain, and means for connecting said chains independently to said central unit for data transfer from each chain to said central unit from one module through another module in succession along each chain and, conversely, for data transfer from said central unit to each chain being effected from one module through another module in succession along the respective chain, whereby interruption of each chain automatically reconfigures flow of data from the interrupted chain to said central unit and from said central unit through the respective chain.

2. The spinning machine defined in claim 1 wherein said sensor elements are speed sensors for rotary speeds of respective travelers at the respective stations.

3. The spinning machine defined in claim 1 wherein said sensor elements are rotary speed sensors for speed of a yarns of respective yarn balloons at the respective stations.

4. The spinning machine defined in claim 1 wherein said sensor elements are rotary speed sensors and the respective modules respond to the respective sensor signals to detect a yarn breakage or sluggish spindle.

5. The spinning machine defined in claim 1 wherein said stations are provided in rows on opposite sides of the machine, each side of the machine having all of said sensor elements thereof connected to modules of one of said chains and all of said effector elements thereof connected to modules of another of said chains.

6. The spinning machine defined in claim 1 wherein said central unit and said modules are in a control hierarchy with said central unit dominant and said modules subordinate, said central unit being formed as an intelligent multifunctional component coordinating all functions of said modules and said elements.

7. The spinning machine defined in claim 6 wherein said machine has a computerized further machine control, said central unit being connected by a bus with said further machine control.

8. A spinning machine comprising:

a multiplicity of spinning stations each receiving a supply of sliver, having means for spinning said sliver into yarn and having a sliver-stopping device a multiplicity of terminal elements including:

at least one sensor element at each station monitoring yarn continuity and producing a sensor signal representing a yarn failure, and an effector element at each station for operating the respective sliver-stopping device in response to at least one effector signal; and control circuitry for said elements for evaluating said sensor signals and generating said effector signals, said control circuitry comprising:

a central control unit, a multiplicity of similar control modules spaced along the machine, each of said control modules being connected to a plurality of said elements and including means for evaluating said sensor signals or generating said effector signals and means for communicating data between said modules and between one of said modules and said central unit, and means for connecting said modules serially in at least one chain and for connecting said at least one chain to said central unit for data transfer from said chain to said central unit being effected from one module through another module in succession along said chain and, conversely, for data transfer from said central unit to said chain being effected from one module through another module in succession along said chain, said sensor elements on one side of said machine being received on a hollow sensor rail extending along said machine side and the modules connected with said sensor elements are located within said rail.

9. The spinning machine defined in claim 8 which is a ring spinning machine having a ring rail formed with said hollow sensor rail.

10. A spinning machine comprising:

a multiplicity of spinning stations each receiving a supply of sliver, having means for spinning said sliver into yarn and having a sliver-stopping device a multiplicity of terminal elements including:

at least one sensor element at each station monitoring yarn continuity and producing a sensor signal representing a yarn failure, and an effector element at each station for operating the respective sliver-stopping device in response to at least one effector signal; and control circuitry for said elements for evaluating said sensor signals and generating said effector signals, said control circuitry comprising:

a central control unit, a multiplicity of similar control modules spaced along the machine, each of said control modules being connected to a plurality of said elements and including means for evaluating said sensor signals or generating said effector signals and means for communicating data between said modules and between one of said modules and said central unit, and means for connecting said modules serially in at least one chain and for connecting said at least one chain to said central unit for data transfer from said chain to said central unit being effected from one module through another module in succession along said chain and, conversely, for data transfer from said central unit to said chain being effected from one module through another module in succession along said chain, all of said sliver-stop devices on a side of said machine being mounted on a hollow metal rail and the modules connected with the effector elements on said machine side are received in said rail.

11. A control system for a textile machine having a multiplicity of operating stations in at least one row at which yarn is wound up, said control system comprising:

at least one sensor element at each station monitoring yarn continuity at the respective station and producing a sensor signal representing a yarn failure;

at least one effector element at each station carrying out a control function at the respective station in response to at least one effector signal resulting from a sensor signal representing a yarn failure at the respective station, each said effector element providing a control of winding up of yarn at the respective station; and control circuitry for said elements for evaluating said sensor signals and generating said effector signals, said control circuitry comprising:

a central control unit, a multiplicity of similar control modules spaced along the machine, some of said control modules being connected to a plurality of said sensor elements and including means for evaluating said sensor signals and others of said modules being connected to respective pluralities of said effector elements for generating said effector signals, means for connecting said some of said modules serially in a first data chain and for connecting said others of said modules in a second data chain, each of said data chains extending along said row, each of said chains independently having means for connecting the respective chain to said central unit at each end of the respective chain for data transfer from each chain to said central unit from one module through another module in succession along the respective chain and, conversely, for data transfer from said central unit to each chain effected from one module through another module in succession along the respective chain, whereby interruption of each chain automatically reconfigures flow of data from the interrupted chain to said central unit and from said central unit through the respective chain.

12. The control system defined in claim 11 wherein each station has a spindle and a respective sliver-stopping device operated by a respective one of said effector elements.

13. The control system defined in claim 11 wherein each of said chains is one of at least a respective plurality of chains connected end to end with one end of each plurality of chains and an opposite end of each plurality of chains being connected to said central control unit.

14. The control system defined in claim 11 wherein said central unit effects an initialization routine for said modules at least at every activation of said circuitry and optionally at predetermined time intervals during operation in which an address is assigned to each module in each chain, a number of modules in each chain is determined, and said number is compared to a stored setpoint number.

15. A control system for a textile machine having a multiplicity of operating stations in at least one row at which yarn is wound up, said control system comprising:

at least one sensor element at each station monitoring yarn continuity at the respective station and producing a sensor signal representing a yarn failure;

at least one effector element at each station carrying out a control function at the respective station in response to at least one effector signal resulting from a sensor signal representing a yarn failure at the respective station, each said effector element providing a control of winding up of yarn at the respective station; and control circuitry for said elements for evaluating said sensor signals and generating said effector signals, said control circuitry comprising:

a central control unit, a multiplicity of similar control modules spaced along the machine, some of said control modules being connected to a plurality of said sensor elements and including means for evaluating said sensor signals and others of said modules being connected to respective pluralities of said effector elements for generating said effector signals, means for connecting said some of said modules serially in a first data chain and for connecting said others of said modules in a second data chain, each of said data chains extending along said row, each of said chains independently having means for connecting the respective chain to said central unit at each end of the respective chain for data transfer from each chain to said central unit from one module through another module in succession along the respective chain and, conversely, for data transfer from said central unit to each chain effected from one module through another module in succession along the respective chain, whereby interruption of each chain automatically reconfigures flow of data from the interrupted chain to said central unit and from said central unit through the respective chain, said elements at each station being mounted on at least one hollow rail and the respective modules being located within said hollow rail.

* * * * *